United States Patent [19]

Yamamura et al.

[11] Patent Number: 5,233,508
[45] Date of Patent: Aug. 3, 1993

[54] DC/DC VOLTAGE CONVERTING DEVICE

[75] Inventors: Norihisa Yamamura; Kazunori Hibino, both of Tokyo; Kotaro Okada, Narashino, all of Japan

[73] Assignee: Motorola, Inc., Schaumburg, Ill.

[21] Appl. No.: 941,830

[22] Filed: Sep. 8, 1992

[30] Foreign Application Priority Data

Sep. 13, 1991 [JP] Japan .................................. 3-261379

[51] Int. Cl.⁵ .......................... H02M 3/335; G05F 1/62
[52] U.S. Cl. ......................................... 363/49; 363/16; 323/222; 323/901
[58] Field of Search ..................... 363/16, 49; 323/222, 323/223, 224, 267, 901

[56]  References Cited

U.S. PATENT DOCUMENTS

| 4,563,733 | 1/1986 | Schlenk | 323/901 X |
| 4,806,842 | 2/1989 | Bittner | 323/901 X |
| 5,084,811 | 1/1992 | Maige et al. | 363/49 |

Primary Examiner—Emanuel T. Voeltz
Attorney, Agent, or Firm—Michael D. Bingham

[57]  ABSTRACT

A DC/DC voltage converting device is obtained for boosting a DC power supply voltage to provide a higher output voltage, comprising soft start circuit 20 for gradually increasing the turning-on duration of transistor 34 in boosting circuit 30; pulse width control circuit 60 for providing a modulated pulse signal P2 to control the boosted voltage. The device further comprises boosting circuit 30 including an inductor 32, diode 36 and transistor 34. Boosting circuit 30 provides a predetermined boosted voltage higher than the power supply voltage by alternately turning on and off transistor 34. The turning-on duration of transistor 34 is gradually increased during the initial operation period by soft start circuit 20, and is controlled by modulated pulse signal P2 during a stable operation period. The device further comprises gate circuit 40 having diode 46 and transistor 44, and step up circuit 70. Step up circuit 70 turns off transistor 44 during the initial operation period, and turns it on while transistor 34 is off during the stable operation period to allow an efficient current flow from boosting circuit 30 to output terminal 58. Any counter current flow from output terminal 58 to boosting circuit 30 is inhibited during the initial operation period.

1 Claim, 6 Drawing Sheets

DC/DC VOLTAGE CONVERTING DEVICE

FIELD OF THE INVENTION

The present invention relates to a DC/DC voltage converting device for use in a power supply circuit, and more specifically to a DC/DC voltage converting device for efficiently converting a relatively low input voltage to a predetermined high voltage.

BACKGROUND OF THE INVENTION

Figure 1:
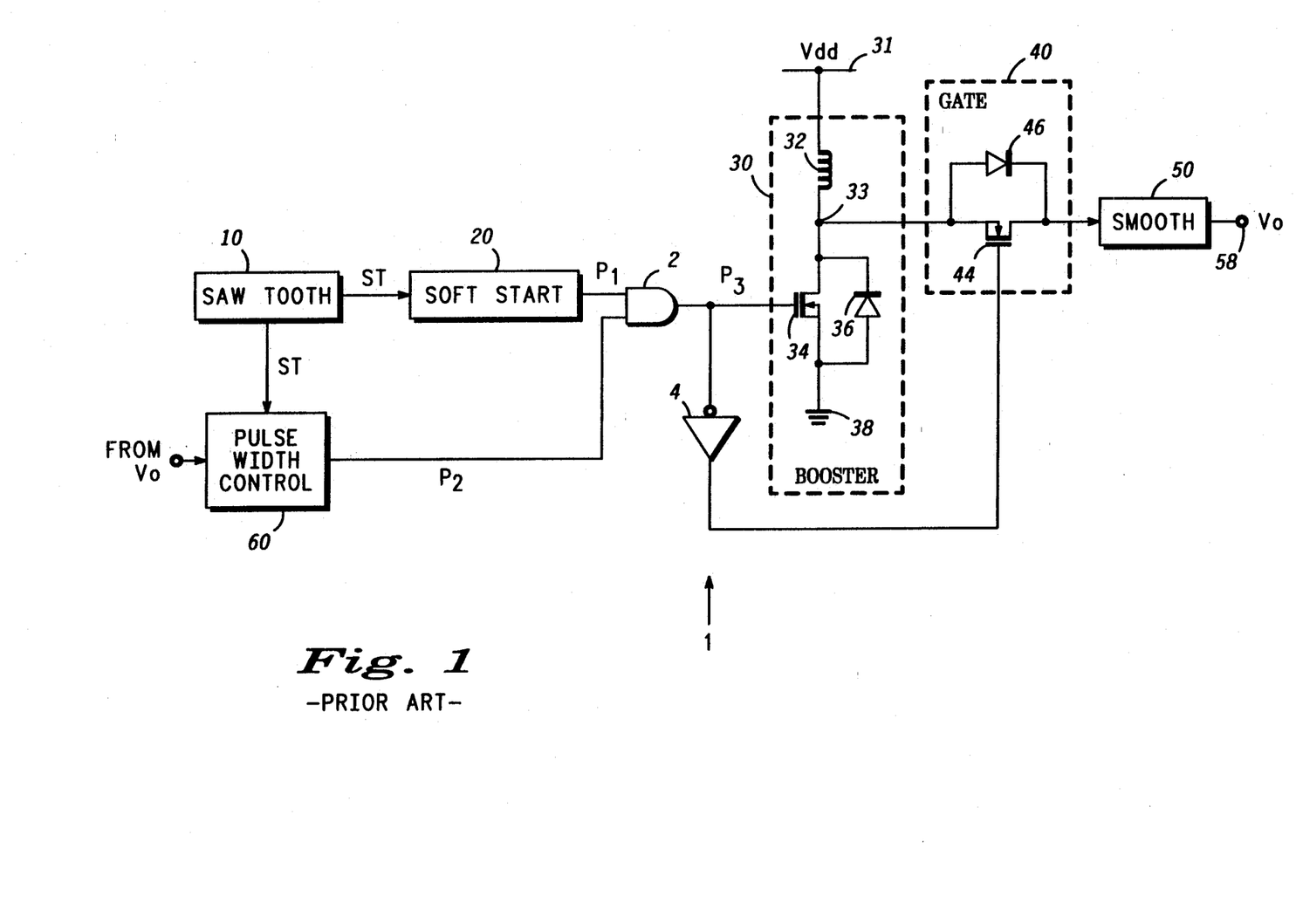
FIG. 1 is a simplified schematic diagram of a prior DC/DC voltage converting device.

There are many portable electronic devices and apparatus, especially in consumer electronics, that use a battery (cell) as their power supply. The voltage supplied from the cell does not necessarily match the voltage level required in the electronic devices. Thus, a need exists to boost the supplied voltage to provide a higher voltage to internal circuits in the electronic devices. A typical prior voltage converting device having such boosting function is shown in FIG. 1.

A boosting circuit 30 receiving power supply voltage Vdd includes a coil 32, a transistor 34 which may be a MOS FET, and a diode 36. One end of coil 32 is connected to power supply line 31, and the other end is connected to the drain of transistor 34. The source of transistor 34 is grounded, and the gate thereof is connected to the output of an AND circuit 2. The cathode and anode of diode 36 are connected to the drain and source of transistor 34, respectively.

Figure 3:
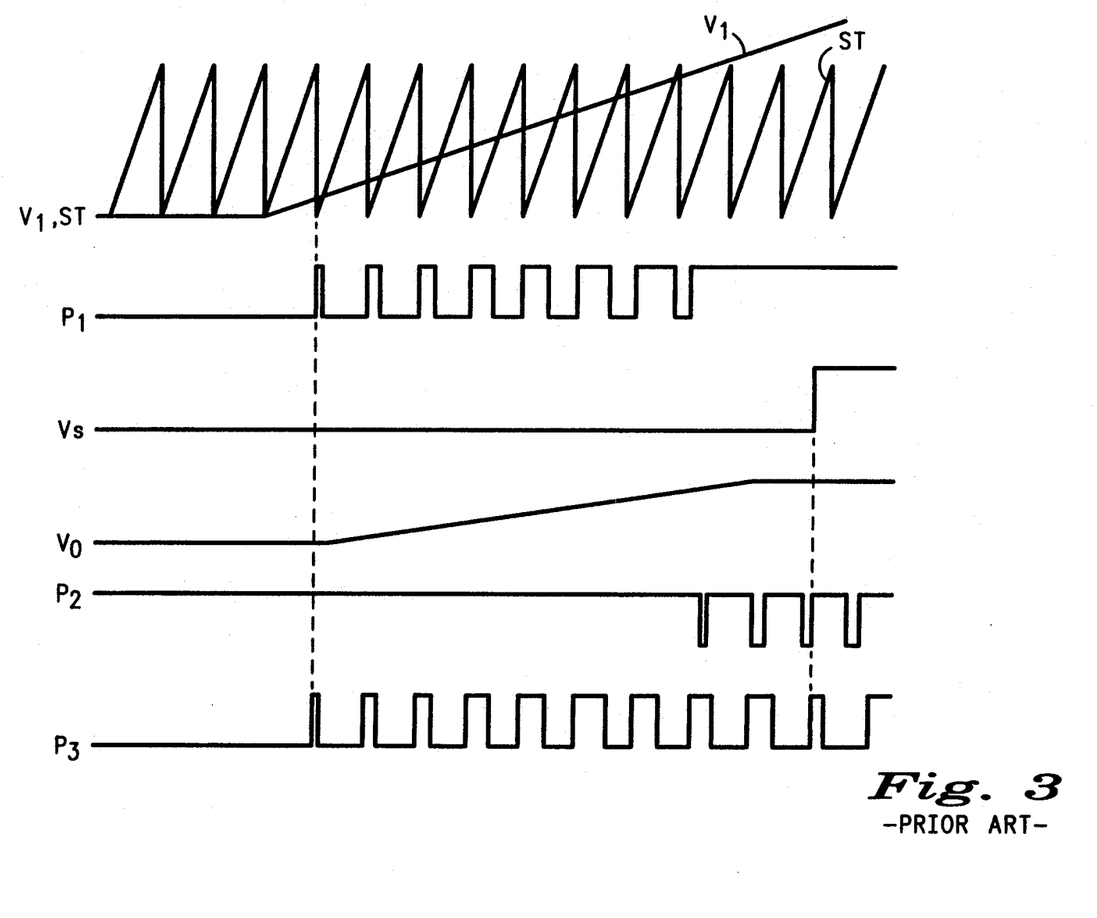
FIG. 3 is a timing chart of signals in prior converting device and a converting device of FIG. 5 according to an embodiment of the invention.

A saw tooth generating circuit 10 provides a saw tooth output ST to a soft start circuit 20. Soft start circuit 20 provides a pulse output P1 to one input of AND circuit 2. The pulse widths of pulse output P1 increase gradually as shown in FIG. 3. This gradual increase is needed for stably starting initial operation. The output of AND circuit 2 is connected to the gate of transistor 34.

Coupled to a node 33 between coil 32 and MOS transistor 34 is a gate circuit 40, comprising a diode 46 and a transistor 44 which may be a MOS FET. A boosted output is supplied from boosting circuit 30 through gate circuit 40 to a smooth circuit 50. A smoothed output voltage Vo is obtained from smooth circuit 50 at an output terminal 58 and supplied to every circuit in the electronic device.

Pulse output P3 of AND circuit 2 is also coupled to the gate of transistor 44 through an inverter 4.

Output voltage Vo of smooth circuit 50 is also supplied to a pulse width control circuit 60. Pulse width control circuit 60 receives a saw tooth output ST from saw tooth generating circuit 10, and provides a modulated pulse signal P2 to the other input of AND circuit 2. The low pulse duration of modulated pulse signal P2, as shown in FIG. 3, becomes long as output voltage Vo becomes high. Pulse output P3 of AND circuit 2 is high only when both pulse output P1 of soft start circuit 20 and pulse output P2 of pulse width control 60 are high.

Figure 2:
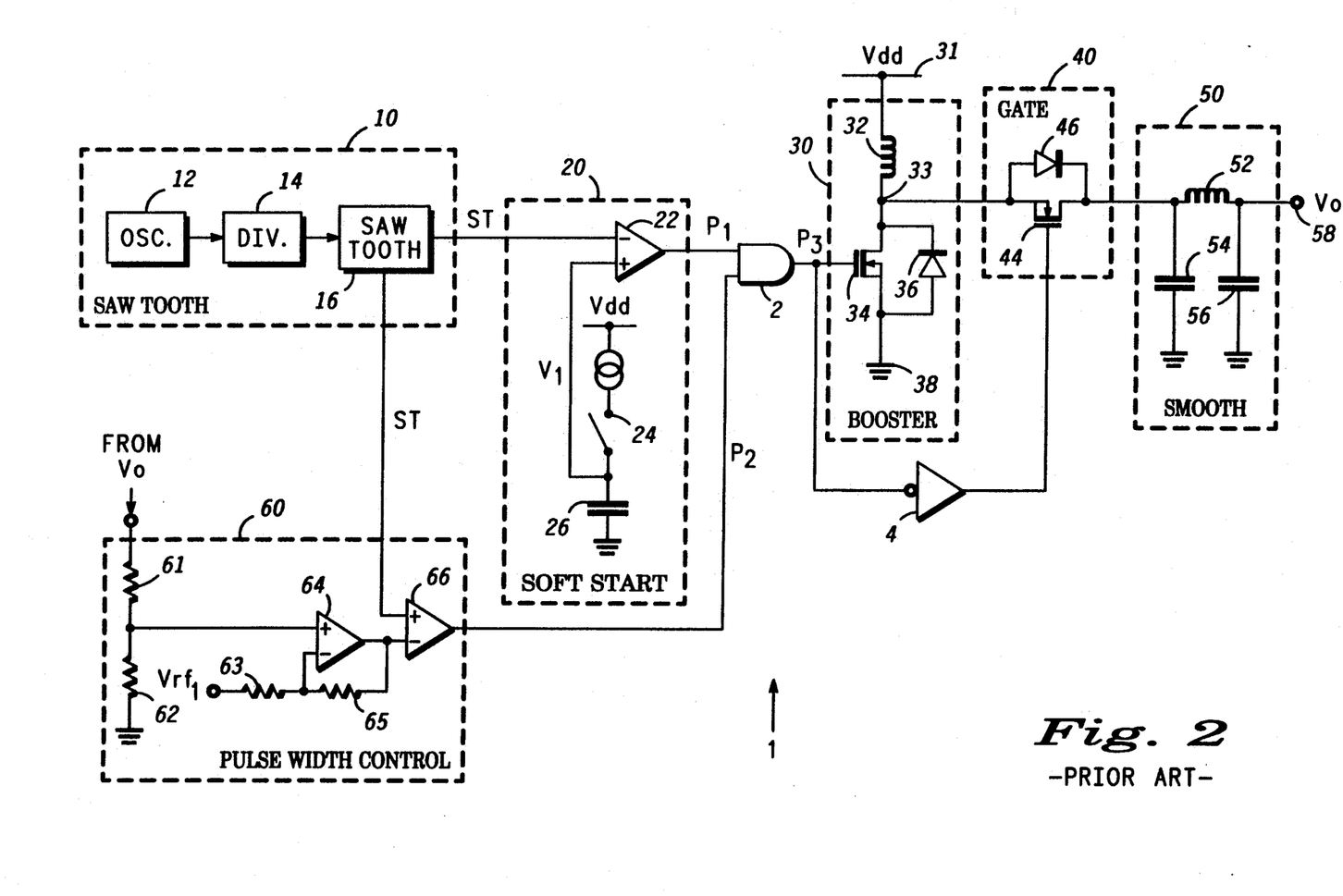
FIG. 2 shows a detailed circuit of the device of FIG. 1.

The operation of prior voltage converting device 1 will now be described with reference to FIG. 2 showing more specific circuit of prior device 1 and FIG. 3 illustrating operational timing chart of device 1. In saw tooth circuit 10, pulses generated by an oscillator 12 is divided by frequency divider 14 to get a low frequency pulse signal. A saw tooth generator 16 receives the low frequency pulse signal from frequency divider 14, generates a saw tooth signal ST (see FIG. 3), and supplies it to the inverting input of an operational amplifier 22 in soft start circuit 20.

The non-inverting input of operational amplifier 22 is connected to one end of a capacitor 26. To this end of capacitor 26, power supply voltage Vdd is also coupled through a constant current supply and a switch 24. The other end of capacitor 26 is grounded. The constant current supply and capacitor 26 forms an integral circuit, and therefore capacitor starts charging or accumulation when switch 24 is closed. When a voltage V1 accumulated on capacitor 26 is higher than saw tooth voltage ST, operational amplifier 22 provides high output (see FIG. 3). Because saw tooth voltage ST has a constant cycle time and capacitor voltage V1 becomes gradually higher, operational amplifier 22 has a pulse output signal P1, the width of which increases gradually (see FIG. 3). This pulse output P1 is supplied to the gate of MOS transistor 34 in boosting circuit 30 via AND circuit 2.

In response to the control pulse applied by AND circuit 2, transistor 34 alternately turns on and off. When transistor 34 is on, a current flows from power line 31 through coil 32 and transistor 34 to the ground, and therefore the voltage level at node 33 becomes low (the drain-to-source voltage of transistor 34). Then, the pulse from AND circuit 2 becomes low and turns off transistor 34. When transistor 34 turns off, the current through coil 32 tends to continue flowing but can not due to the high resistances of transistor 34 and diode 36. Thus an induced electromotive force creates at node 33 a voltage higher than power supply voltage Vdd. This induced voltage is supplied through gate circuit 40 to smooth circuit 50.

The logical output of AND circuit 2 is also applied through inverter 4 to the gate of FET transistor 44. Therefore, while transistor 34 is off, transistor 44 is on. The induced voltage created by the inductance of coil 34 makes a current flow from node 33 through transistor 44 to smooth circuit 50, which accumulates a high voltage. Next, when transistor 34 turns on, it allows current flow from power supply voltage Vdd to the ground, and the voltage of node 33 becomes low again. At this time transistor 44 is off, and a counter current does not flow from smooth circuit 50 to boosting circuit 30. In this manner, transistor repeats turning on and off, the boosted charge is accumulated at smooth circuit 50.

The pulsating voltage entering into smooth circuit 50 is smoothed by capacitors 54, 56 and a coil 52. The boosted and smoothed output voltage Vo can be taken out an output terminal 58 and supplied to other electronic circuits including voltage dividing resistors 61, 62 in pulse width control circuit 60.

At the first stage in the initial operation period, the amount of the current from power supply through coil 32 to the ground has to be restricted in order to prevent over load and stably start the boosting operation. For that purpose, the turning-on duration of transistor 34 is shortened by initially lowering the duty ratio of the pulse signal P1 applied to the gate of transistor 34. Then, as shown in FIG. 3, the turning-on duration of transistor 34 is made longer gradually by soft start circuit 20 to gradually increase output voltage Vo appearing at output terminal 58.

Output voltage Vo from smooth circuit 50 is fed back to pulse width control circuit 60, divided by resistors 61, 62, and supplied to the non-inverting input of an operational amplifier 64. A first reference voltage Vrf1 is given to the inverting input of operational amplifier 64 via a resistor 63. The voltage difference between the non-inverting input voltage and first reference voltage Vrf1 is amplified with a ratio determined by resistors 63, 65. The amplified voltage difference is then compared with saw tooth voltage ST in an operational amplifier 66 to provide a pulse signal P2 (see FIG. 3).

If output voltage Vo becomes higher than a desired level, pulse width control circuit 60 shorten the turning-on duration of transistor 34. For that purpose, the low pulse duration of pulse P2, which disables AND circuit 2, is made longer as shown in FIG. 3. A resultant logical output P3 of AND circuit 2 shown in FIG. 3 controls the operation of boosting circuit 30 to obtain the desired output voltage. In this manner, the desired voltage level is maintained irrespective of load variation.

Although the ideal operation of prior voltage converting device 1 has been described, device 1 actually does not necessarily operate well as described above. That is, current Ic flowing through coil 32 does not necessarily follow the solid line shown in FIG. 4, but may follow the dotted line in FIG. 4. Because the low pulse duration of pulse signal P1 and therefore the turning-on duration of transistor 44 is long at the beginning in the initial operation period, a counter current flows from high voltage smooth circuit 50 to boosting circuit 30 after coil current Ic decreases to zero (see the dotted line in FIG. 4). Accordingly the normal start of operation is not guaranteed in the prior converting device.

BRIEF DESCRIPTION OF THE INVENTION

Accordingly, it is an object of the present invention to provide an improved DC/DC voltage converting device in which a counter current flow is inhibited during the initial operation period. It is a further object to provide such DC/DC voltage converting device which allows an efficient forward current flows during the stable operation period.

These and other objects and advantages are provided, in an embodiment, by a DC/DC voltage converting device 5 for receiving a DC power supply voltage Vdd and boosting the received voltage Vdd to provide a boosted output voltage Vo at an output terminal 58, comprising:

a soft start circuit 20 for providing output pulses P1, the widths of the output pulses P1 being gradually increasing during an initial operation period;

a pulse width control circuit 60 for responding the output voltage Vo fed back from the output terminal 58 to provide a modulated pulse signal P2;

a boosting circuit 31 including an inductor 32 coupled to the power supply voltage Vdd, and a switching element 34 coupled in series to the inductor 32 and coupled to the soft start circuit 20 and the pulse width control circuit 60, said boosting circuit 30 providing a predetermined boosted voltage higher than the power supply voltage Vdd by alternately turning on and off the switching element 34, the turning-on duration of the switching element 34 being gradually increased during the initial operation period by the output pulses P1 from the soft start circuit 20 to softly start said DC/DC voltage converting device 5, and said turning-on duration of the switching element 34 being controlled by the modulated pulse signal P2 during the stable operation period to provide the predetermined boosted voltage;

a gate circuit 40 including a rectifying element 46 and a switching element 44 coupled in parallel and between the boosting circuit 30 and the output terminal 58; and a step up circuit 70 coupled to the gate circuit 40, for turning off the switching element 44 in the gate circuit 40 during the initial operation period, and turning on the switching element 44 in the gate circuit 40 while the switching element 34 in the boosting circuit 30 turns off during the stable operation period to allow efficient current flow from the boosting circuit 30 to the output terminal 58, whereby counter current flow from the output terminal 58 to the boosting circuit 30 is inhibited during the initial operation period.

In a preferred embodiment, switching element 34 in boosting circuit 30 is alternately turned on and off by the soft start pulse signal and the modulated pulse signal. Energy stored in inductor 32 makes a current flow through gate circuit 40 to output terminal 58. Thus boosted output voltage can be derived at output terminal 58. Switching element 44 in gate circuit 40 turns off during the initial operation period to inhibit a counter current flow from output terminal 58 to boosting circuit 30, and on the other hand allows an efficient current flow from boosting circuit 30 to output terminal 58 during the stable operation period.

The above described invention will be more fully understood by reference to the accompanying figures and description thereof that follows.

DESCRIPTION OF A PREFERRED EMBODIMENT

Figure 5:
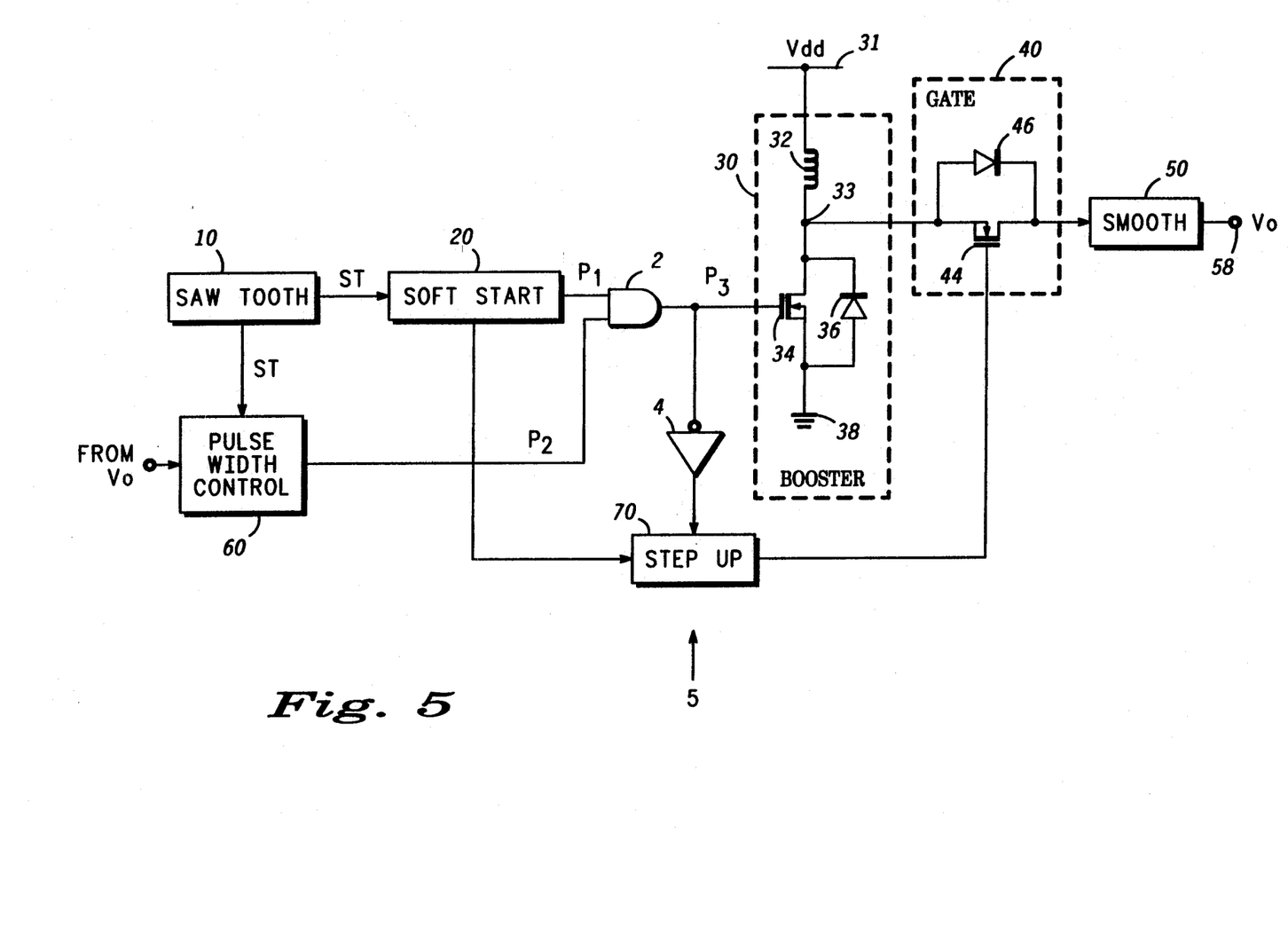
FIG. 5 is a simplified schematic diagram of one preferred embodiment DC/DC voltage converting device according to the invention.

FIG. 5 shows a schematic diagram of a DC/DC voltage converting device according to a preferred embodiment of the present invention. DC/DC voltage converting device 5 receives a DC power voltage Vdd supplied by a battery such as manganese, alkaline, mercury, Ni-Cd and other battery, and boosts the received voltage to provide an output voltage Vo at an output terminal.

A boosting circuit 30 receiving power supply voltage Vdd includes a coil 32, a transistor 34 which may be a MOS FET, and a diode 36. One end of coil 32 is connected to power supply line 31, and the other end is connected to the drain of transistor 34. The source of transistor 34 is grounded, and the gate thereof is connected to the output of an AND circuit 2. The cathode and anode of diode 36 are connected to the drain and source of transistor 34, respectively. It is desirable that transistor 34 has a low on-resistance. For that purpose, power MOS transistors such as LD MOS series marketed by Motorola may be utilized. Although boosting circuit 34 has one boosting stage in this embodiment, two boosting stages may be employed for more efficient operation.

A saw tooth generating circuit 10 provides a saw tooth output ST to a soft start circuit 20. Soft start circuit 20 provides a pulse output P1 to one input of AND circuit 2. The pulse widths of pulse output P1 increase gradually as shown in FIG. 3. This gradual increase is needed for stably starting initial operation. The output of AND circuit 2 is connected to the gate of transistor 34.

Coupled to a node 33 between coil 32 and MOS transistor 34 is a gate circuit 40, comprising a diode 46 and a transistor 44 which may be a MOS FET. Diode 46 is desirably a Schottky diode having a low forward breakdown voltage. A boosted output is supplied from boosting circuit 30 through gate circuit 40 to a smooth circuit 50. A smoothed output voltage Vo is obtained from smooth circuit 50 at an output terminal 58 and supplied to every circuit in the electronic device.

Pulse output P3 of AND circuit 2 is also coupled to the gate of transistor 44 through an inverter 4.

Output voltage Vo of smooth circuit 50 is also supplied to a pulse width control circuit 60. Pulse width control circuit 60 receives a saw tooth output ST from saw tooth generating circuit 10, and provides a modulated pulse signal P2 to the other input of AND circuit 2. The duration of the low pulse of modulated pulse signal P2, as shown in FIG. 3, becomes long as output voltage Vo becomes high. Pulse output P3 of AND circuit 2 is high only when both pulse output P1 of soft start circuit 20 and pulse output P2 of pulse width control 60 are high.

Figure 6:
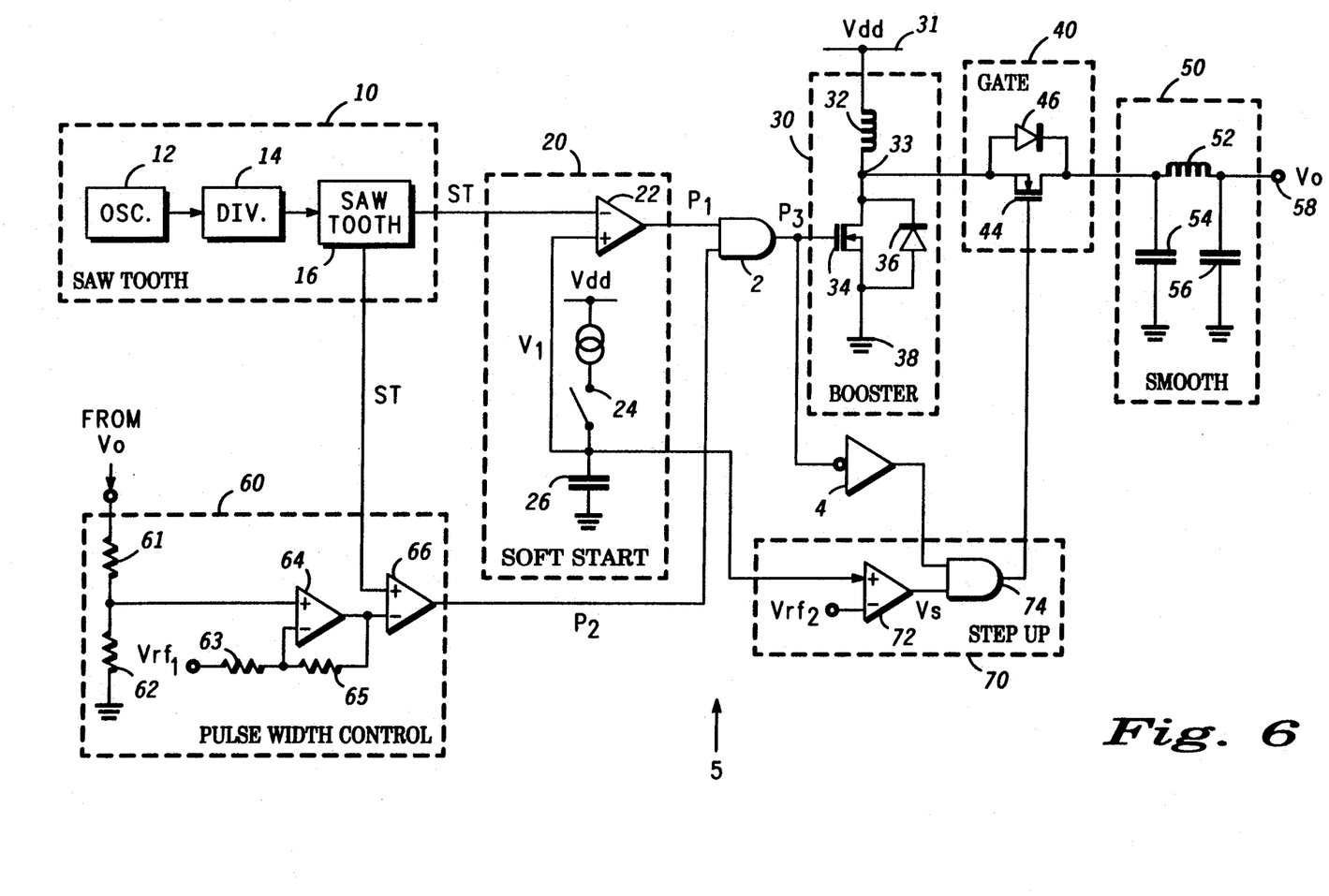
FIG. 6 shows a detailed circuit of the embodiment device of FIG. 5.

The operation of the embodiment voltage converting device 5 will now be described with reference to FIG. 6 showing more specific circuit of device 5 and FIG. 3 illustrating operational timing chart of device 5. In saw tooth circuit 10, pulses generated by an oscillator 12 is divided by frequency divider 14 to get a low frequency pulse signal, e.g. 128 kHz. A saw tooth generator 16 receives the low frequency pulse signal from frequency divider 14, generates a saw tooth signal ST (see FIG. 3), and supplies it to the inverting input of an operational amplifier 22 in soft start circuit 20.

The non-inverting input of operational amplifier 22 is connected to one end of a capacitor 26. To this end of capacitor 26, power supply voltage Vdd is also coupled through a constant current supply and a switch 24. The other end of capacitor 26 is grounded. The constant current supply and capacitor 26 forms an integral circuit, and therefore capacitor starts charging or accumulation when switch 24 is closed. When a voltage V1 accumulated on capacitor 26 is higher than saw tooth voltage ST, operational amplifier 22 provides high output (see FIG. 3). Because saw tooth voltage ST has a constant cycle time and capacitor voltage V1 becomes gradually higher, operational amplifier 22 has a pulse output signal P1, the width of which increases gradually (see FIG. 3). This pulse output P1 is supplied to the gate of MOS transistor 34 in boosting circuit 30 via AND circuit 2. Power may be supplied to oscillator 12, frequency divider 14, saw tooth generator 16 and soft start circuit 20 from output terminal 58.

In response to the control pulse applied by AND circuit 2, transistor 34 alternately turns on and off. When transistor 34 is on, a current flows from power line 31 through coil 32 and transistor 34 to the ground, and therefore the voltage level at node 33 becomes low (the drain-to-source voltage of transistor 34). Then, the pulse from AND circuit 2 becomes low and turns off transistor 34. When transistor 34 turns off, the current through coil 32 tends to continue flowing but can not due to the high resistances of transistor 34 and diode 36. Thus an induced electromotive force creates at node 33 a voltage higher than power supply voltage Vdd. This induced voltage is supplied through gate circuit 40 to smooth circuit 50.

At the first stage in the initial operation period, the amount of the current from power supply through coil 32 to the ground has to be restricted in order to prevent over load and stably start the boosting operation. For that purpose, the turning-on duration of transistor 34 is shortened by initially lowering the duty ratio of the pulse signal P1 applied to the gate of transistor 34. Then, as shown in FIG. 3, the turning-on duration of transistor 34 made longer gradually by soft start circuit 20 to gradually increase output voltage Vo appearing at output terminal 58.

Figure 4:
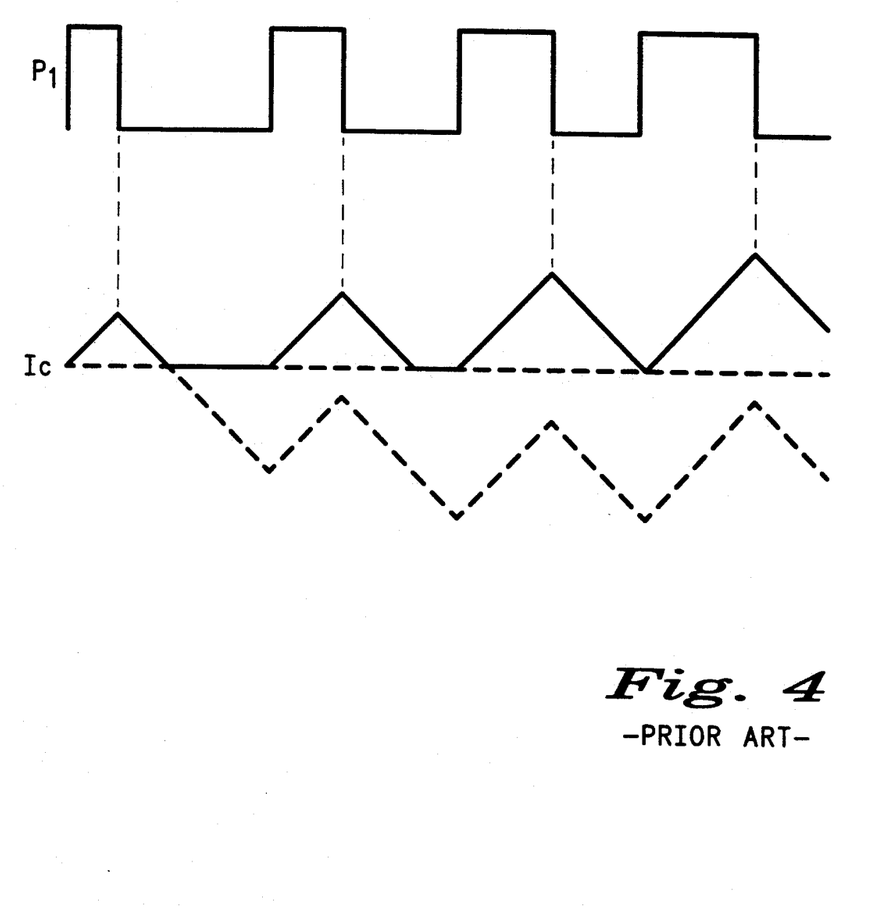
FIG. 4 is a waveform diagram of a pulse P1 from a softstart circuit 20 and a current Ic flowing through a coil 32 in prior converting device and the embodiment device.

The logical output of AND circuit 2 is also applied through inverter 4 and step up circuit 70 to the gate of FET transistor 44. As shown in FIG. 6, voltage V1 charged in capacitor 26 is supplied to the non-inverting input of an operational amplifier 72 of step up circuit 70. Coupled to the inverting input of operational amplifier 72 is a second reference voltage Vrf2. Operational amplifier 72 provides an output Vs to enable an AND circuit 74 when voltage V1 is higher than Vrf2. After switch 24 is closed at the beginning of the initial operation of device 5, step up circuit 70 keeps transistor 44 off till V1 surpasses Vrf2. Accordingly, any counter current flow, encountered in the prior device during the initial operation period, is inhibited. A desired forward current can flow through diode 46 to smooth circuit 50, although there is a loss by diode voltage drop. Therefore, current Ic as shown by the solid line in FIG. 4 is obtained. When the soft start is completed and the stable operation period starts, V1 becomes large enough to enable AND circuit 74. As a result, the inverting signal of pulse output P3 from AND circuit is coupled to the gate of transistor 44, and therefore transistor 44 turns on and off at the opposite phase with transistor 34. Thus, while transistor 34 is off, transistor 44 is on. The induced voltage created by the inductance of coil 32 makes a current flow from node 33 through transistor 44 to smooth circuit 50, which accumulates a high voltage. Next, when transistor 34 turns on, it allows current flow from power supply voltage Vdd to the ground, and the voltage of node 33 becomes low again. At this time transistor 44 is off, and a counter current does not flow from smooth circuit 50 to boosting circuit 30. In this manner, transistor repeats turning on and off, the boosted charge is accumulated at smooth circuit 50. During the stable operation period, current Ic induced by coil 32 can flow through not diode 46 but transistor 44 having low on-resistance, resulting in efficient current flow and therefore efficient boosting.

The pulsating voltage entering into smooth circuit 50 is smoothed by capacitors 54, 56 and a coil 52. The boosted and smoothed output voltage Vo can be taken out at an output terminal 58 and supplied to other electronic circuits including voltage dividing resistors 61, 62 in pulse width control circuit 60.

Output voltage Vo from smooth circuit 50 is fed back to pulse width control circuit 60, divided by resistors 61, 62, and supplied to the non-inverting input of an operational amplifier 64. A first reference voltage Vrf1 is given to the inverting input of operational amplifier 64 via a resistor 63. The voltage difference between the non-inverting input voltage and first reference voltage Vrf1 is amplified with a ratio determined by resistors 63, 65. The amplified voltage difference is then compared with saw tooth voltage ST in an operational amplifier 66 to provide a pulse signal P2 (see FIG. 3).

If output voltage Vo becomes higher than a desired level, pulse width control circuit 60 shorten the turning-on duration of transistor 34. For that purpose, the low pulse duration of pulse P2, which disables AND circuit 2, is made longer as shown in FIG. 3. A resultant logical output P3 of AND circuit 2 shown in FIG. 3 controls the operation of boosting circuit 30 to obtain the desired output voltage. In this manner, the desired voltage level is maintained irrespective of load variation.

Output voltage Vo may be supplied to pulse width control circuit 60.

According to the invention, any counter current flow from the smooth circuit to the boosting circuit can be inhibited during the initial operation period, and boosting operation is efficiently performed during the stable operation period. Therefore, the safe start of the converting device is guaranteed.

We claim:

1. A DC/DC voltage converting device for receiving a DC power supply voltage and boosting the received voltage to provide a boosted output voltage at an output terminal, comprising:

a soft start circuit for providing output pulses, the widths of the output pulses being gradually increasing during an initial operation period;

a pulse width control circuit for responding the output voltage fed back from the output terminal to provide a modulated pulse signal;

a boosting circuit including an inductor coupled to the power supply voltage, and a switching element coupled in series to the inductor and coupled to the soft start circuit and the pulse width control circuit, said boosting circuit providing a predetermined boosted voltage higher than the power supply voltage by alternately turning on and off the switching element, the turning-on duration of the switching element being gradually increased during the initial operation period by the output pulses from the soft start circuit to softly start said DC/DC voltage converting device, and said turning-on duration of the switching element being controlled by the modulated pulse signal during a stable operation period to provide the predetermined boosted voltage;

a gate circuit including a rectifying element and a switching element coupled in parallel and between the boosting circuit and the output terminal; and a step up circuit coupled to the gate circuit, for turning off the switching element in the gate circuit during the initial operation period, and turning on the switching element in the gate circuit while the switching element in the boosting circuit turns off during the stable operation period to allow efficient current flow from the boosting circuit to the output terminal, whereby counter current flow from the output terminal to the boosting circuit is inhibited during the initial operation period.

* * * * *